3,349,798
VARIABLE VALVES
Jesse O. Allen, 940 Ellis Ave., Orangeburg, S.C. 29115
Filed July 6, 1964, Ser. No. 380,314
3 Claims. (Cl. 137—625.17)

This invention relates generally to valves and particularly to valves for use in natural gas supply systems.

In natural gas supply systems, valves are generally used in combination with pressure regulators to supply demands of gas under conditions of stable pressure. However, since most natural gas supply systems are subject to demands which vary according to the season, considerable difficulty is experienced in attaining optimum system performance on a year round basis. In winter months, for example, pressures must be stabilized while large quantities of gas are passed through the valves. On the contrary, in summer months, comparatively small quantities of gas are passed through the same valves and are subject to regulation. It follows that the valve-regulator combination best suited for winter usage does not have satisfactory characteristics for summer usage. And similarly, the valve-regulator combination best suited for summer usage is unsatisfactory for winter usage.

It is the object of this invention to provide a valve which may be used with a single, conventional regulator, and which may be adjusted to give optimum valve-regulator characteristics as seasonal demands dictate.

With the above and other objects in view which will become immediately apparent from the specification, my invention resides in the novel form, construction, arrangement and combination of parts presently described and set forth in the claims:

In the drawings:

FIGURE 8 is a sectional view taken along lines 8—8 of FIGURE 2.

Figure 1:
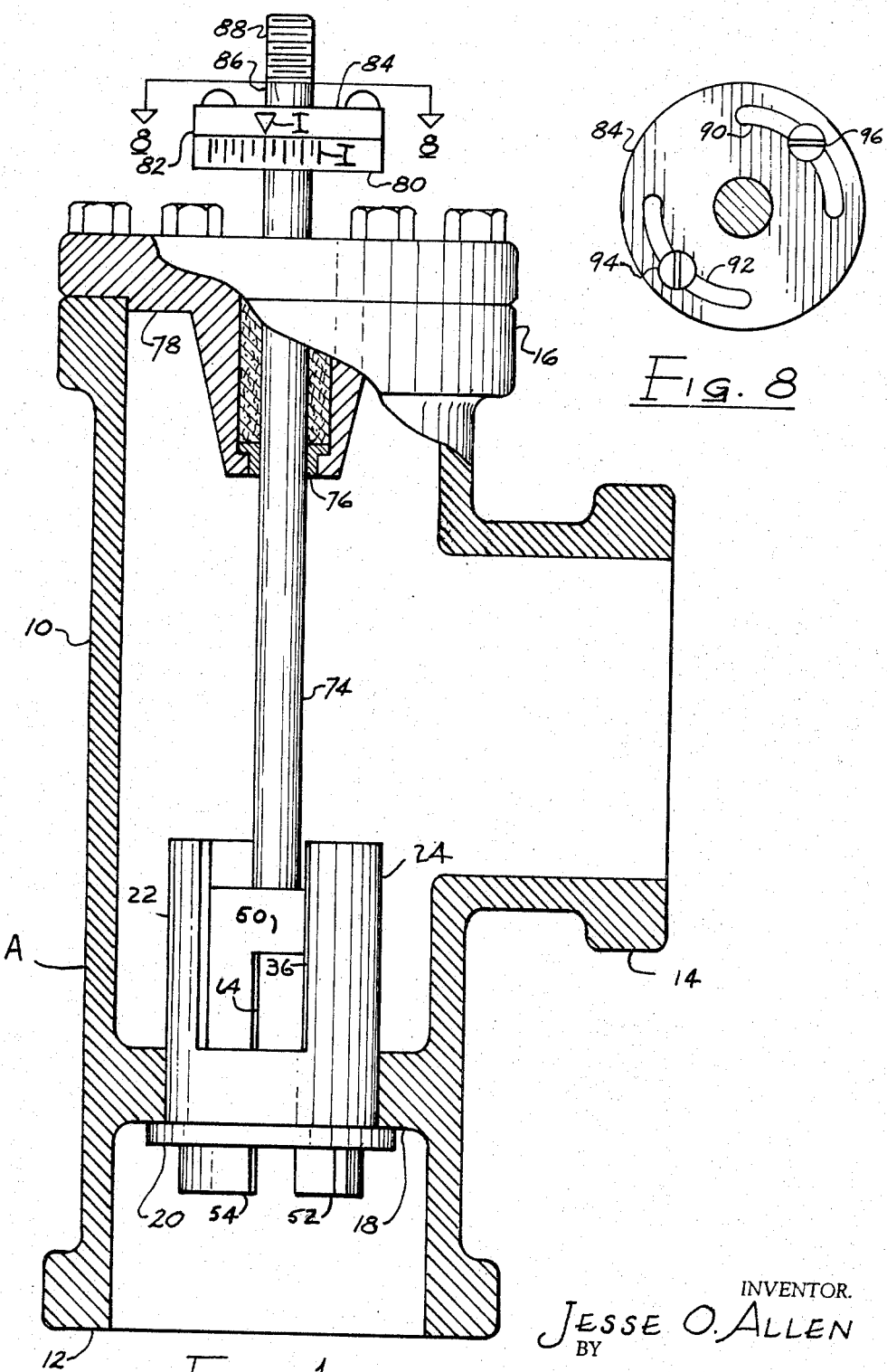
FIGURE 1 is a side elevational view of a valve constructed in accordance with my invention and having a portion of its housing partially broken away to reveal the inner construction.

Referring now in more detail and by reference character to the drawings which illustrate a preferred embodiment of the present invention, A designates a valve comprising a housing 10 which is integrally provided with an inlet connection 12, an outlet connection 14, and a regulator attachment connection 16. Adjacent the inlet connection 12, the housing 10 is integrally provided with an annular shoulder 18 to which an elongated castellated cylindrical sleeve 20 is threadedly secured (threads not shown).

Figure 5:
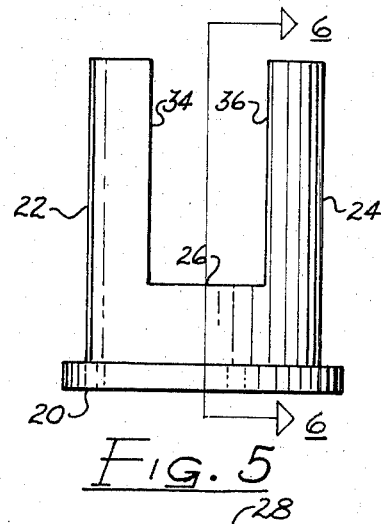
FIGURE 5 is a side elevational view of the stationary valve element.
Figure 6:
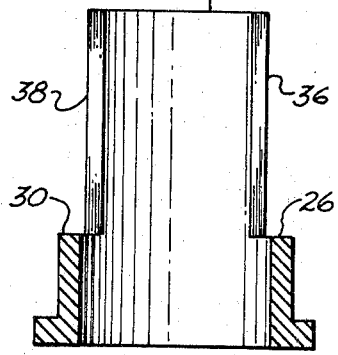
FIGURE 6 is a sectional view taken along lines 6—6 of FIGURE 5.
Figure 7:
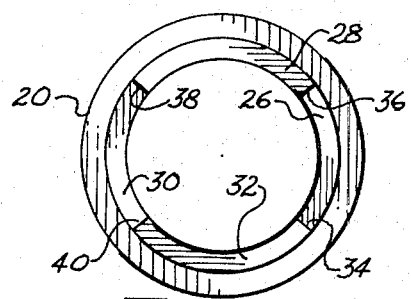
FIGURE 7 is a top plan view thereof.

At one end the sleeve 20 is flanged for engagement with the annular shoulder 18. At the opposing end the sleeve 20 is provided with a pair of diametrally opposed castellating members 22, 24, which are defined by annular margins 26, 28, 30, and 32 and elemental margins 34, 36, 38, and 40, as best seen in FIGURES 5–7. The annular margins 26 and 30 are co-planar and define a first plane which is perpendicular to the longitudinal axis of the sleeve 20. Similarly, the annular margins 28 and 32 are co-planar and define a second plane which is also perpendicular to the longitudinal axis of the sleeve 20. The elemental margins 34, 36, 38 and 40 are terminated in edges which are parallel to each other and to the longitudinal axis of the sleeve 20, all for purposes presently more fully to appear.

Figure 2:
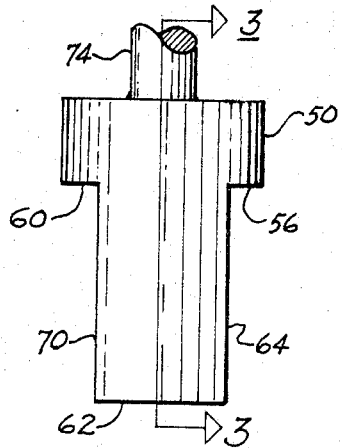
FIGURE 2 is a side elevational view of the movable valve element.
Figure 3:
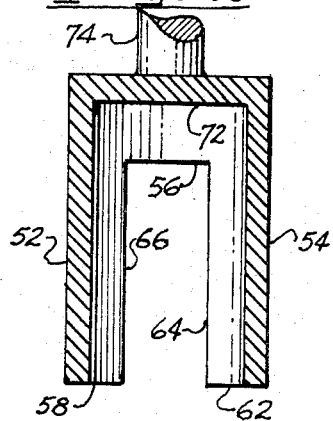
FIGURE 3 is a sectional view taken along lines 3—3 of FIGURE 2.
Figure 4:
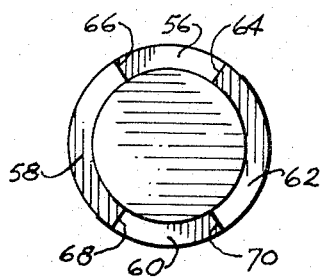
FIGURE 4 is a bottom view thereof.

Disposed within the sleeve 20 and axially movable therein is a capped cylindrical castellated valve member 50 which is provided at one end with a pair of diametrally opposed castellating members 52, 54, which are defined by annular marigns 56, 58, 60 and 62 and elemental margins 64, 66, 68, and 70 all as best seen in FIGURES 2–4. The annular margins 56 and 60 are co-planar and define a first plane which is perpendicular to the longitudinal axis of the member 50. Similarly, the annular margins 58 and 62 are co-planar and define a second plane which is also perpendicular to the longitudinal axis of the member 50. The elemental margins 64, 66, 68 and 70 are terminated by edges which are parallel to each other and to the longitudinal axis of the member 50, all for purposes presently more fully to appear.

The opposing end of the member 50 is closed by an integrally provided cap 72 to which is welded or otherwise rigidly secured one end of an elongated rod 74. The rod 74 extends from the cap 72 through a sealed opening 76 in a sealed cover 78 on the regulator attachment connection 16 and is terminated outwardly thereof by one element 80 of a rotatably adjustable linkage 82. The linkage 82 includes a second element 84 to which is secured one end of a second substantially shorter rod 86 threaded on its other end 88 for attachment to a regulator (not shown).

The linkage 82 is conventional in construction and operation and provides for rotational adjustment of the element 80 with respect to the element 84 by means of a pair of arcuate apertures 90, 92, in the element 84. A pair of screws 94, 96 are threadedly attached to the element 80 through the apertures 90, 92, whereby the angular positions of the elements 80 and 84 with respect to the axis of the rod 74 may be selectively secured.

It should be here noted that rotation of the element 80 about the longitudinal axis of the rod 74 will cause the rotation of the cylindrical member 50 within the sleeve 20, and further that when the elements 80 and 84 are secured to each other and the rod 86 is secured to the regulator (not shown) the rotational positions of the member 50 within the sleeve 20 will become fixed. For purposes of identifying the position of the member 50 with respect to the sleeve 20, the lateral faces of the elements 80, 84, are provided with conventional scaled markings I.

The member 50 and the sleeve 20 are co-axial, and the regulator (not shown) is conventionally adapted for causing linear movement of the member 50 along the common axis as pressures in the system vary. As the member 50 is snugly disposed within the sleeve 20, the castellating members 22, 24, of the sleeve 20 coact with the castellating members 52, 54, of the member 50 to form diametrally opposed ports through which the gas may pass from the inlet connection 12 to the outlet connection 14. In FIGURE 1, the port formed by the annular margin 26 and the elemental margin 36 of the sleeve 20 and the annular margin 56 and the elemental margin 64 of the element 50 is shown.

The separation between the complementary element margins 36, 64, is selectively varied according to the expected needs of the season and the separation is then fixed by the tightening of the screws 94, 96, in the linkage 82. As demands for gas change in the outlet line (not shown) to which the outlet connection 14 is connected, the regulator (not shown) will cause axial movement of the member 50 within the sleeve 20. Since the annular margins 26, 56, are both perpendicular to the longitudinal axis of the sleeve 20, the port orifice will vary linearly with the movement of the member 50 between the fully closed position and the maximum open position the regulator will permit. Thus the size of the port orifice at the maximum open position may be selectively varied according to the demands placed upon the system at any given time, and the sensitivity of the valve regulator combination may be thus selectively varied according to the maximum demand expected of the system during such period of time. In addition, the full operating range of the regulator may be utilized during any given season with a single valve and valve wear may be equalized.

Although only one of the ports was described above (only one port being shown in the drawings), it should be understood that the complementary port formed by the margins 30, 40, 60, and 70, is identical in size, shape, variability and regulator response to the port described above.

When two of the above described valves are connected to each other and to a single regulator in such manner that movement of the regulator push rod (not shown) will cause simultaneous movement of the valve members 50 within their respective sleeves 20, a most interesting result is obtained. In such case, the two inlet connections can be connected to different sources, and the two outlet connections can be connected to each other, and a result will be achieved which is presently unknown in the art. The ultimate result of such arrangement will be a valve in which mixtures may be maintained at constant predetermined ratios regardless of the axial position of the regulator push rod. This result is achieved solely because of the linear relation between push rod position and orifice size. In addition, it is to be noted that the respective linkages 82 also permit varying ratios between the orifice sizes in the two valves.

Although the above specification has described a preferred embodiment of my invention as being used in a gas system, it should be apparent that the described valve is also readily adaptable to a liquid system by any person skilled in the art.

It should be further understood that changes in the form, construction, arrangement and combination of parts may be made and substituted for those herein described without departing from the nature and principle of my invention.

Having thus described my invention, what I desire to secure by Letters Patent is recited in the annexed claims, in which I claim:

1. A variable orifice valve comprising a housing having first and second chambers, an elongated cylindrical sleeve secured to said housing and being provided near its end with a first U-shaped cut-out portion, an elongated cylindrical valve member disposed coaxially within said cylindrical sleeve and being axially and rotationally movable with respect thereto, said valve member also being provided near its end with a second U-shaped cut-out portion, said first cut-out portion being defined by a first pair of elemental margins, each of which is parallel to the common axis and a first bight margin which is perpendicular thereto, said second cut-out portion being defined by a second pair of elemental margins each of which is parallel to the common axis and a second bight margin which is perpendicular thereto adjustable means for selectively securing the rotational position of the sleeve and the valve member with respect to each other whereby to define a rectangular orifice of fixed and predetermined maximum area, and externally responsive means for moving the valve member axially within the sleeve while the relative rotational position of the sleeve and valve member remains fixed, whereby to cause the open area of the rectangular orifice to vary linearly as the axial position of the valve member with respect to the sleeve is changed.

2. The device of claim 1 wherein the valve member is disposed within the sleeve and the cut-out portions of the sleeve and valve member are so located as to seal the first chamber from the second chamber when the member is wholly within the sleeve.

3. A valve comprising a housing having a first chamber and a second chamber, a cylindrical sleeve secured to the housing between the first and second chambers, a cylindrical valve member disposed within the sleeve about a common axis and being axially and rotationally movable with respect thereto, said sleeve and valve member each being integrally provided with cooperating orifice defining means for defining a rectangular passageway between the first and second chambers, releasably securable means for setting the width of the rectangular passageway at a preselected value, and externally responsive means for varying the height of the rectangular passageway in linear relation to externally directed movement of the valve member and in which the height of the rectangular passageway varies directly with the axial position of the valve member with respect to the sleeve.

References Cited

UNITED STATES PATENTS

| | | | |
|---|---|---|---|
| 2,145,133 | 1/1939 | Riney | 137—607 |
| 2,171,992 | 9/1939 | Rantine | 137—607 |
| 2,261,596 | 11/1941 | Stroobants | 251—205 |
| 2,642,254 | 6/1953 | Armstrong | 137—625.37 |
| 2,917,069 | 12/1959 | Lundy | 251—205 |
| 3,213,888 | 10/1965 | Cameron | 137—637.4 |
| 2,212,343 | 8/1940 | Goehring | 137—625.3 |
| 2,197,954 | 4/1940 | Turpin | 251—209 |

M. CARY NELSON, *Primary Examiner.*

W. R. CLINE, *Assistant Examiner.*